TELEPHONE CARRIER SYSTEM

Filed Oct. 12, 1959 4 Sheets-Sheet 1

Inventors
BURWOOD P. NICHOLLS
J. ALMON COY
ERNEST S. KELSEY
By Robert B. Harmon
Attorney Inventors
BURWOOD P. NICHOLLS
J. ALMON COY
ERNEST S. KELSEY By Robert B. Harmon
Attorney Inventors
BURWOOD P. NICHOLLS
J. ALMON COY
ERNEST S. KELSEY By Robert B. Harmon
Attorney Inventors
BURWOOD P. NICHOLLS
J. ALMON COY
ERNEST S. KELSEY
By Robert B. Harmon
Attorney 3,103,556
Patented Sept. 10, 1963

3,103,556

TELEPHONE CARRIER SYSTEM

Burwood P. Nicholls, Lynwood Village, Ontario, Canada, J. Almon Coy, Phoenix, Ariz., and Ernest S. Kelsey, Lachine, Quebec, Canada, assignors to Northern Electric Company, Limited, Montreal, Quebec, Canada, a corporation of Canada Filed Oct. 12, 1959, Ser. No. 845,669
11 Claims. (Cl. 179—15)

This invention relates to multi-channel communication systems and more particularly to the automatic regulation of the transmission signal and the maintaining of the service of the system.

To permit the extension of multi-channel carrier systems and maintain the system in service, regulation and maintenance circuits have been devised to correct for variations due to changes in temperature and to restore the system into service respectively.

An object of this invention is to provide a multi-channel carrier repeatered communication system which is economical to manufacture and operate.

It is another object of this invention to provide a multi-channel carrier repeatered communication system having the foregoing characteristics having means to automatically compensate for the effects on the signal transmission of fortuitous changes in the transmission conditions.

A related object is to provide a multi-channel carrier repeatered communication system capable of extending the length of the system otherwise restricted by signal distortion.

Another object of this invention is to provide a multi-carrier communication system having the foregoing characteristics having means to regulate the flat and slope characteristics of the complete group of channels with additional means for the regulation of each channel carrier.

A further object of this invention is to provide a multi-carrier communication system having the foregoing characteristics having switching means at the repeater points for disabling the output of the repeaters and receiving amplifiers of the terminals during a period of system failure adapted to prevent premature restoration of the system to service.

A still further object of this invention is to provide a multi-channel carrier communication system having the foregoing characteristics having means to automatically remove the system from service on system failure and means to test and restore the system to service after the fault has been eliminated.

These and other objects of this invention are attained in one embodiment by providing means to obtain the difference between the sum of the highest and lowest carriers employed in a system and a reference voltage level and means to obtain the difference between the two stated carriers, the resultants being applied to means inserted in the transmission line to regulate respectively the flat and slope components of the transmitted signal and by providing means associated with the regulating means to indicate a loss of carrier in the system and to automatically remove the system from service during the loss of carrier and means to test and restore to service from either end of the system.

A better understanding of the invention may be obtained by referring to the following description, taken in cooperation with the accompanying drawings, in which like numbers refer to like parts:

The restoration and maintenance apparatus employed in this invention may be employed for use with a 12 channel repeatered carrier system having for example a high group of frequencies of 100–148 kc. in the E—W direction of transmission and a low group of frequencies of 40–88 kc. in the W—E direction of transmission. The 12 channels employed in the system to be described may be divided into 3 groups of 4 channels each and it will be noted that channels 1 and 4 of a group are associated with the restoration and maintenance units as will be described hereinafter.

Figure 1:
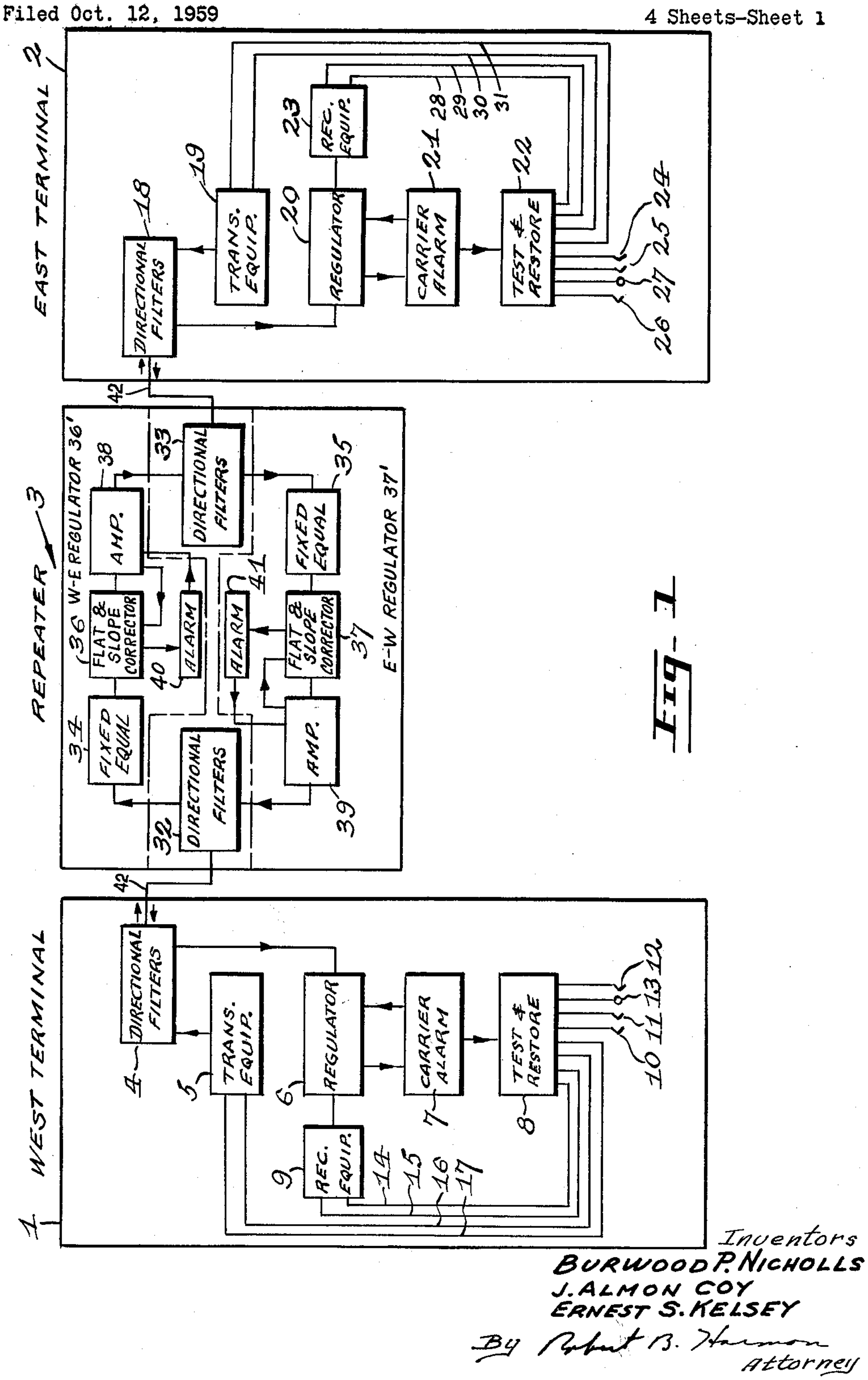
FIG. 1 illustrates a block diagram of a portion of a multi-channel carrier wave signal transmission system including the regulation and maintenance elements employed in the invention.

Considering FIG. 1, there is shown a West and East terminal 1 and 2 respectively and a repeating point 3 located therebetween. Any number of repeating points may be employed between terminals.

In the West terminal 1 there is shown directional low and high pass frequency filters 4 connected to carrier transmitting equipment 5, regulator unit 6, carrier alarm unit 7, test and restore unit 8, carrier receiving equipment 9, test keys 10, 11, restore key 12, test lamp 13, conductors 14, 15, 16, 17.

The equipment illustrated in the East terminal 2 is identical with that shown in the West terminal 1 and consists of directional low and high pass frequency filters 18 connected to the carrier transmitting equipment 19, regulator unit 20, carrier alarm unit 21, test and restore unit 22, carrier receiving unit 23, test keys 24, 25, restore key 26, test lamp 27, conductors 28, 29, 30, 31.

In the repeater unit 3 there is shown directional low and high pass frequency filters 32, 33 and in the E—W direction of the energy flow, regulator 37' consisting of fixed equalizer 35, flat and slope corrector unit 37, amplifier 39, connected in series between directional filters 33 and 32 and alarm unit 41, and in the W—E direction of energy flow, regulator 36' consisting of fixed equalizer 34, flat and slope corrector unit 36, amplifier 38, connected in series between directional filters 32 and 33 and alarm unit 40, the repeater being connected to the West and East terminal by line 42.

The regulator units 6 and 20 at the terminals are identical in structure to the regulator units 36' and 37' used at the repeaters.

Figure 2:
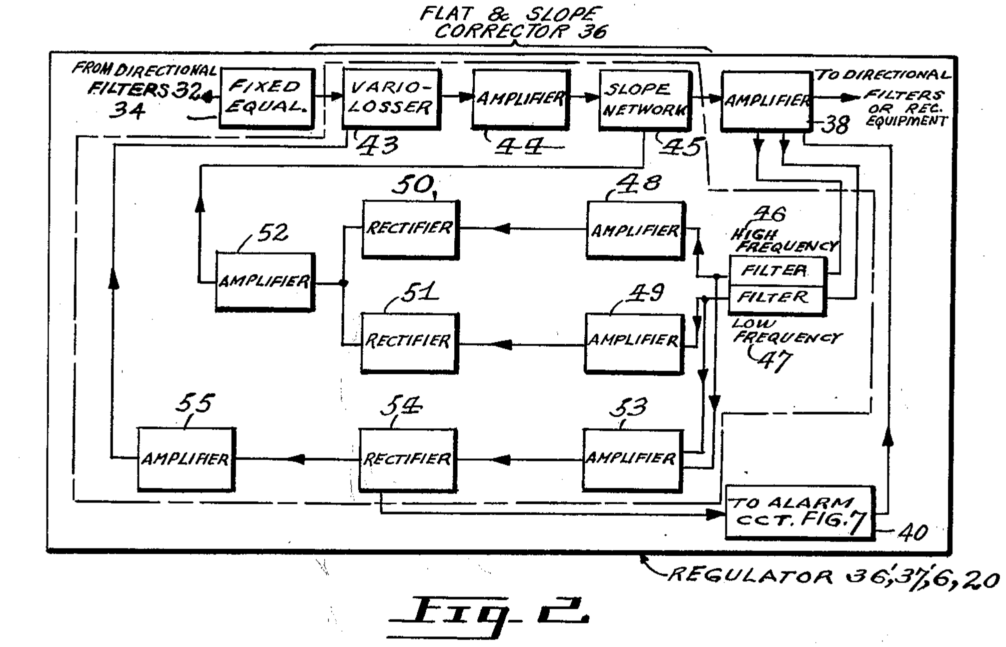
FIG. 2 illustrates a block diagram of the elements forming the slope and flat characteristics regulation unit, employed in the invention at terminal and repeater points.

In FIG. 2 there is shown the elements forming the W—E regulator unit 36', consisting of fixed equalizer 34, variolosser 43, amplifier 44, slope network 45, amplifier 38, connected in series relation, narrow band pick-off high and low frequency filters 46 and 47, identical amplifiers 48 and 49, rectifiers 50 and 51, connected respectively in series relation; the output of the rectifiers 50 and 51 being connected in opposing polarities to input of D.-C. amplifier 52, the output of which is connected to the slope network 45, these elements controlling the slope frequency characteristic of the transmitted signal; amplifier 53 the input of which is connected in parallel relation with the high and low pass filters 46, 47, rectifier 54, amplifier 55 the output of which is connected to variolosser 43. These elements control the flat frequency characteristic of the transmitted signal. Alarm unit 40 is connected from rectifier 54 to amplifier 38.

Considering now the individual elements in detail employed in the system, all the amplifiers, fixed equalizers, filters, carrier transmitting equipment may be of the conventional type.

Figure 3:
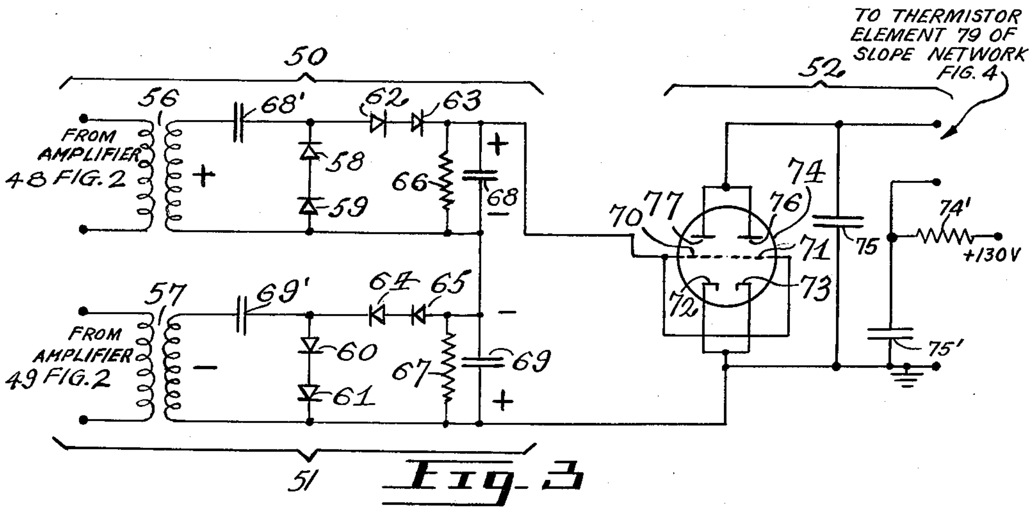
FIG. 3 illustrates the schematic circuit for the rectifier and combining unit for the slope characteristic control of the transmitted composite signal.

Considering the remaining elements in detail employed in the system of the invention, there is shown in FIG. 3 schematic circuit diagram for the rectifier and D.-C. amplifiers units 50, 51 and 52 respectively, FIG. 2. This circuit FIG. 3 comprises two rectifier circuits, which are identical except for the poling of the outputs derived therefrom, consisting individually of input transformers 56 and 57, varistors 58, 59 and 60, 61 connected in series relation in shunt across the secondary winding of the input transformers 56 and 57, varistors 62, 63 and 64, 65 connected in series relation, the varistors being poled oppositely with respect to the two rectifier circuits, load resistors 66 and 67, capacitors 68, 68', 69, 69' respectively, the two rectifier output voltages being connected in series opposing relation from the grids 70, 71 to the cathodes 72, 73 of vacuum tube 74, by-pass capacitor 75 connected from the plates 76, 77 to the cathodes 72, 73 of vacuum tube 74. Also shown is the +130 volt energy source, resistor 74' and by-pass capacitor 75'.

Figure 4:
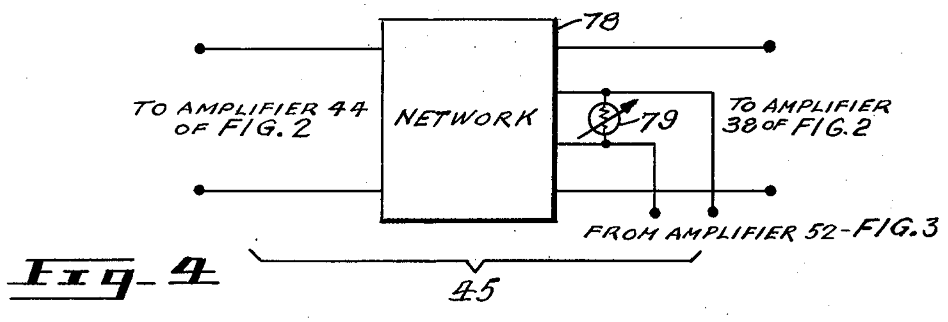
FIG. 4 illustrates the schematic circuit for slope network used with the slope control unit employed in the invention.

With reference to FIG. 4, there is shown the slope network comprising the network element 78 made variable by means of a thermistor element 79.

Figure 5:
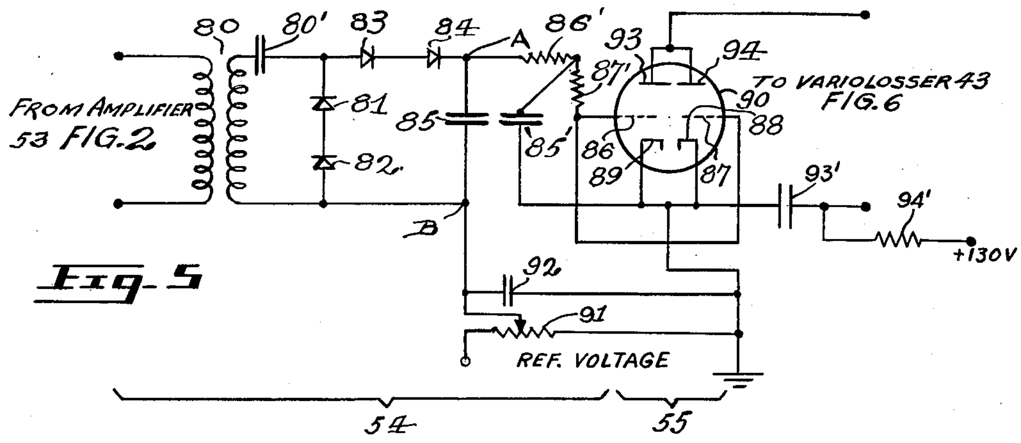
FIG. 5 illustrates the schematic circuit for the rectifier and combining unit for the flat characteristic control of the transmitted composite signal.

With respect to FIG. 5, which shows the rectifying unit and the amplifier for the control of the flat frequency characteristic, there is shown input transformer 80, capacitor 80' and varistors 81, 82 connected in series relation in shunt across capacitor 80' and the secondary winding of transformer 80, varistors 83, 84 connected in series relation in the circuit, capacitors 85, 85', resistors 86', 87', reference D.C. voltage applied in series with the output voltage of the rectifier to the grids 86, 87 and cathodes 88, 89 of vacuum tube 90, so that the net voltage applied to these grids is the difference of the two, 91 being the potentiometer for adjusting the reference and capacitor 92 a by-passing medium for A.C. undesired currents, 93 and 94 being the plate electrodes for the tube 90. The plate supply to vacuum tube 90 is applied through resistor 94' and the variolosser circuit, FIG. 6. Capacitor 93' is a by-pass capacitor for unwanted A.C. currents.

Figure 6:
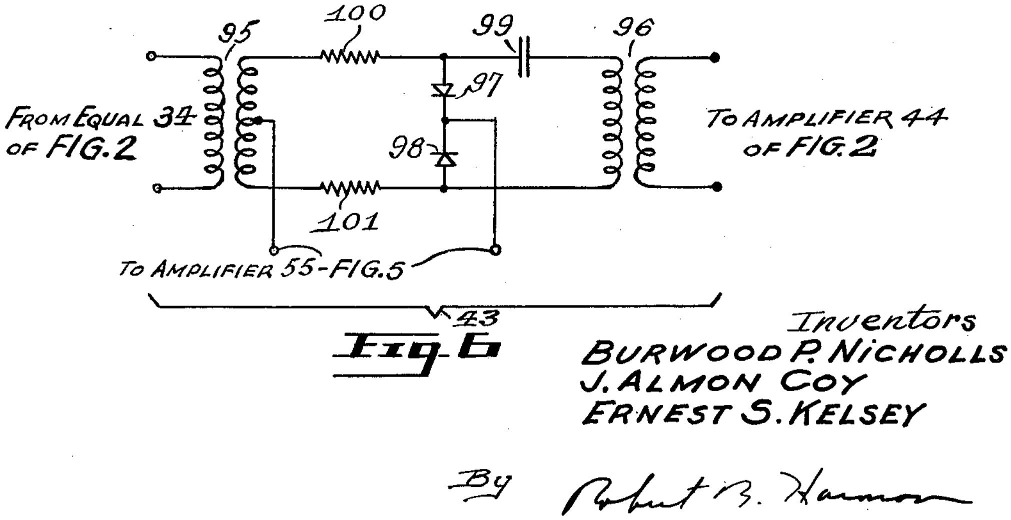
FIG. 6 illustrates the schematic for the variolosser circuit used with the flat control unit employed in the invention.

In FIG. 6 is shown the variolosser 43, FIG. 2, which comprises an input and output transformer 95 and 96 respectively, varistors 97, 98 connected back to back in shunt relation across the circuit, capacitor 99, impedance control resistors 100, 101.

Figure 7:
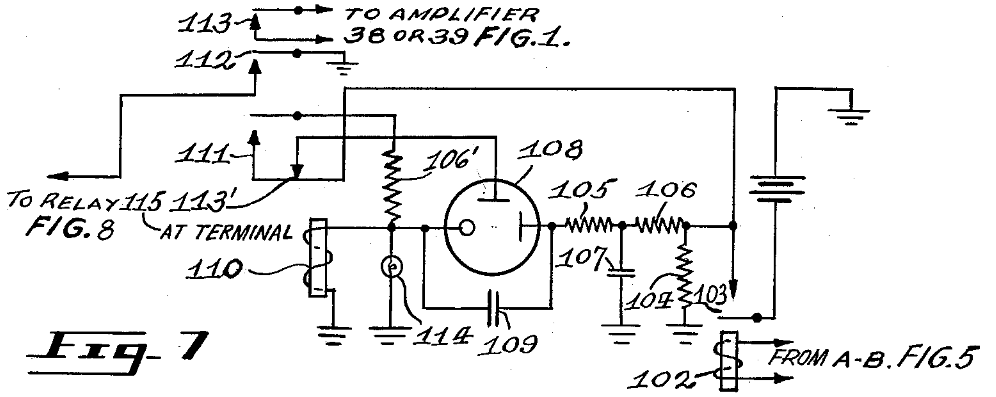
FIG. 7 illustrates the schematic for the alarm circuit employed in the invention.

In FIG. 7 there is shown the alarm schematic circuit employed in the invention consisting of carrier frequency failure relay 102, having normally operated contacts 103, energized from the D.-C. resultant current from the control points A—B of the flat control unit, FIG. 5, potential divider circuit consisting of resistors 104, 106, timing circuit consisting of resistor 105 and capacitor 107, gas filled tube 108, by-pass capacitor 109, voltage reducing resistor 106', control relay 110 having normally open contacts 111, 112, 113, normally closed contact 113', indicator lamp 114.

Figure 8:
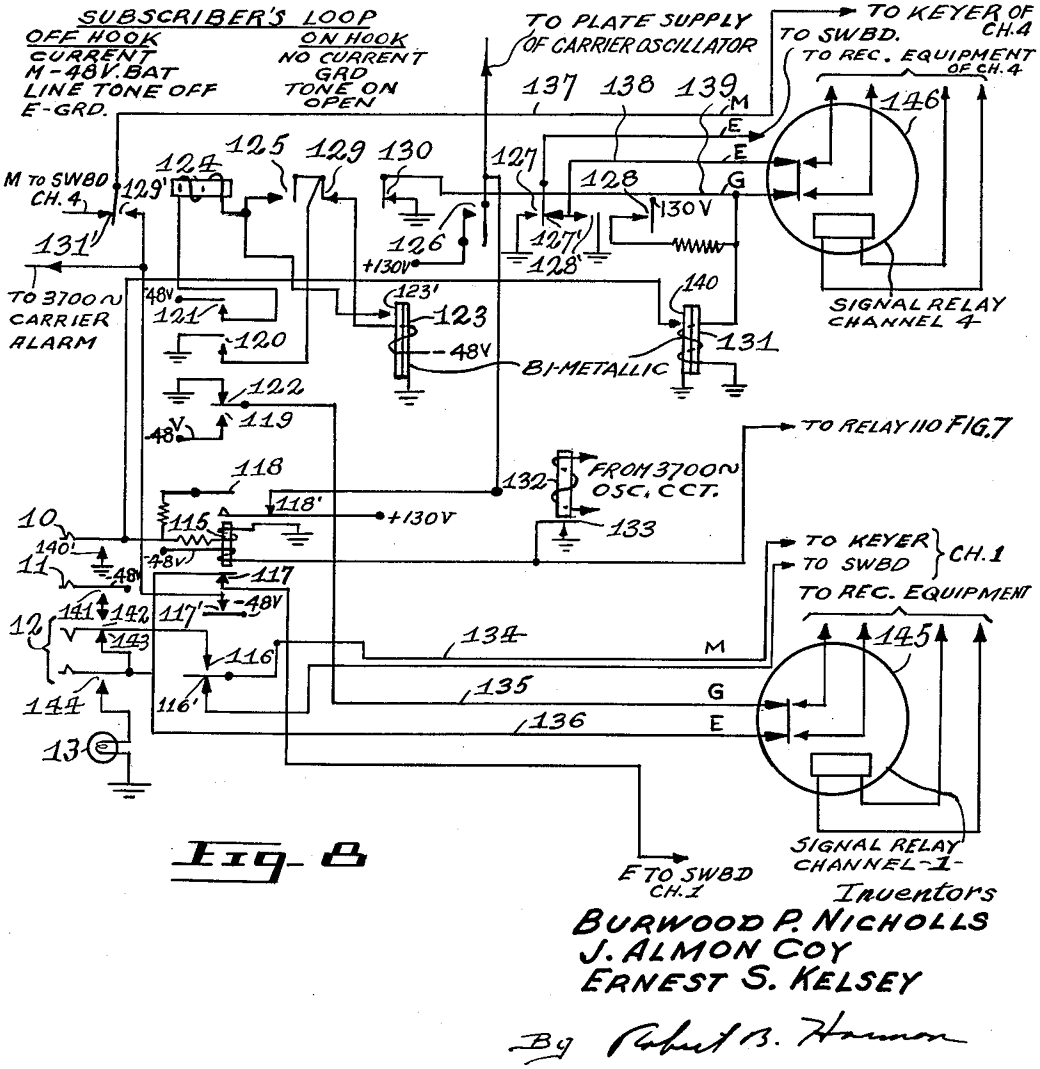
FIG. 8 illustrates the schematic for the test and restore circuit employed in the invention.

In FIG. 8 is shown the terminal carrier alarm and test and restore schematic circuit 7 and 8, or 21 and 22, FIG. 1, consisting of master control relay 115 having open and closed contacts 116, 117', 118, 119, 120, 121 and 116', 117, 118', 122 respectively, delay bi-metallic relay 123, having open contacts 123', relay 124 having open and closed contacts 125, 126, 127, 128, 128', 129' and 127', 129, 130, 131' respectively, restore bi-metallic relay 131, having open contacts 140, 3700 cycle tone actuated relay 132 having contacts 133, held open when relay 132 is energized, conductors 134, 135, 136 representing the keyer control lead and supervisory leads respectively, for channel 1 and 137, 138 and 139 representing the keyer control lead and supervisory leads respectively for channel 4. Keys 10, 11 and 12 are equipped with contacts 140', 141, and 142, 143 and 144 respectively. There is also illustrated in FIG. 8, signal relays 145 and 146 for channels 1 and 4 respectively, further details of which may be had by referring to Canadian Patent No. 510,581, F. S. Entz et al., issued March 1, 1955. Contacts 144 are connected to indicator lamp 13, +130 volt potential is connected to open contacts 126, 128 and closed contact 118'. Negative 48 volt potential is connected to open contacts 119, 117' and 121.

In the operation of the device with respect to automatic regulation of the slope and flat characteristics of the transmitted signal, consider the transmission is in the West to East direction as in FIG. 1. The transmitted signal, after passing through the repeater point is then directed at the East terminal 2, through directional filters 18, regulator 20.

Consider the regulation as applied at a repeater or terminal point, as illustrated in FIGS. 1 and 2, the signal is transmitted through that portion of the regulating unit 36', FIG. 2, consisting of fixed equalizer 34, variolosser 43, amplifier 44, slope network 45, the output of which is directed to the amplifier 38. A portion of the energy from amplifier 38 is directed to the pair of pick-off filters 46 and 47 which filter out the highest and lowest carrier frequencies employed in the system and individually applies these carriers to amplifier 48, rectifier 50 and amplifier 49, rectifier 51, respectively, the outputs from the rectifiers 50 and 51 being applied in opposing polarity to the amplifier 52 the output of which is directed to the slope network 45, these elements controlling the slope characteristic of the regulator. Another portion of the energy from the pick-off filters 46 and 47 is directed in combination, to amplifier 53, rectifier 54, and amplifier 55 the output of which is applied to variolosser 43, these elements controlling the flat characteristic of the regulator.

Considering FIG. 3 which shows the schematic circuit for the rectifier units 50, 51 and the amplifier 52 employed with respect to the slope characteristic control unit, the two carriers filtered out by the filters 46 and 47 are applied individually to the rectifiers 50 and 51, designated "+" and "—," the two rectifiers being connected in series and poled so that the voltages across the resistors 66 and 67 add algebraically and since these voltages are opposite in polarity, a voltage equal to the difference is applied to the grids 70 and 71 of the vacuum tube 74 in amplifier 52.

As illustrated in FIG. 2, the output of the amplifier 52 is applied to the slope network 45, the schematic circuit being shown in FIG. 4. In this circuit, FIG. 4, the slope characteristic of network section 78 is adjustable by means of thermistor 79 whose resistance is controlled by the current supplied from the amplifier 52, the direction of and magnitude of the slope correction depending on the magnitude of the control current applied from the amplifier 52.

Considering FIG. 5, which shows the schematic circuit for the rectifier unit 54 and amplifier 55 employed with respect to the flat characteristic control unit, the output of amplifier 53 of FIG. 2 is applied to the rectifier unit 54, the output of which is applied to the grids 86, 87 of the vacuum tube 90 in series with an opposing reference voltage. A net voltage resulting from the difference between these two voltages is amplified and the amplifier output is applied to the variolosser 43, FIG. 2, the schematic for which is shown in FIG. 6. Depending on the magnitude of the applied D.C. voltage from the amplifier 55, the transmission loss of the variolosser is regulated and the flat component of the transmitted signal is accordingly corrected.

Since it is desirable in the regulation of a transmission circuit that an indication be given as to whether or not the carrier is being applied, this invention incorporates means for:

(1) On failure of the carriers in one direction of transmission, the carriers in the opposite direction of transmission are briefly interrupted so that both terminals and repeater points are alarmed.

(2) Connected subscribers are given a disconnect period long enough to permit them to hang up.

(3) After this interval all derived circuits are made busy.

(4) Carrier 3700 cycle alarm activated. (Operations 1 to 4 are automatic.)

(5) Means are provided for the attendant at either terminal to test the system in both directions and if it is in working condition to restore it to service. (Operation 5 requires manual action by an attendant.)

FIGS. 7 and 8 show the alarm and control circuits for performing these functions, the alarm circuit, FIG. 7, appearing at the terminals 1 and 2 and repeater point 3 and the control circuit, FIG. 8, at the terminals 1 and 2, only.

In the alarm schematic circuit with respect to the terminals 1 and 2, repeater 3, FIG. 7, relay 102, which is operated as long as the carrier is being received over the system, is energized from the D.C. component derived from the rectifier unit 54 at junction points A—B FIG. 5 of the flat characteristic control circuit. If now the carrier is lost, relay 102 deenergizes closing its contacts 103 and applying a voltage to the capacitor 107 through the circuit: battery—103—106—107—ground. After a predetermined lapse of time, effective to prevent the premature alarming of the system when a momentary loss of carrier occurs, capacitor 107 becomes charged to a voltage which actuates gas filled tube 108 so that relay 110 now energizes. The energizing of relay 110 closes its contacts 111, 112, 113, locking up through contacts 111 under control of relay 102. This operation lights alarm indicating lamp 114, and at the terminals applies ground through contacts 112 to relay 115 in the control circuit allowing it to energize. Contact 113' also opens removing the 130 volt plate battery from the main anode of the gas tube 108. Switch contacts 113 are provided which permit the output of the amplifier 38, FIG. 1, to be short-circuited to prevent restoration of the system during the period of carrier failure. Resistor 106' functions to reduce the voltage applied to the lamp 114.

At the terminal the energizing of relay 115 closes contacts 118 causing the relay to lock up and become independent of line noise and crosstalk, and opens contacts 118' removing the 130 volt plate supply from the carrier oscillator, so that transmission of the carrier from the terminal is stopped, alarming the distant terminal and ensuring the operation of relay 115 and the release of the signal relays 145 and 146 at the distant terminal. At both terminals, through closed contacts 116, 119 and the released armature of relay 145, −48 volt battery is applied to the keyer preventing the transmission of 3700 cycle tone over channel 1 in either direction. The E leads to the office supervisory or dial equipment are opened at contact 117 and at other contacts not shown in the diagram, so that interfering pulses due to noise or crosstalk will not reach the office equipment.

After a predetermined interval, during which the subscriber's circuits are disconnected by auxiliary apparatus not shown, from the transmission line, relay 123 energizes through contacts 129 and 120. This energizes relay 124 through contacts 121 and 123' and this relay 124 locks up through contacts 121, 125 and 120.

The operation of relay 124 restores, through contacts 126, the 130 volt plate supply to the carrier terminal oscillator. Also, by supplying ground on the "E" leads at contact 127, and on other contacts of this relay not shown in the drawing, all circuits derived from this carrier system appear busy to the dial switching office.

The operation of relays 115 and 124 applies −48 volt battery through contacts 117' and 129' to the keyer of channel 4 preventing 3700 cycle tone going out on this channel 4 and, through contacts 116, 143, connects the 136 and 134 leads so as to repeat back a signal received from the distant terminal. The operations of relays 115 and 124 take place at both the near and the distant terminals during the period when the carriers are removed from the line.

By operating key 12 the −48 volt circuit from contact 119 to the keyer in channel 1 is broken. The keyer in channel 1 of the near terminal therefore sends 3700 cycle tone over the carrier circuit to the distant terminal. The presence of this tone causes relay 145 of channel 1 in that terminal to be actuated, removing battery from the channel 1 keyer at that terminal and thus causing a 3700 cycle tone to be sent back over the carrier system channel 1 to the near terminal. This received tone causes relay 145 to be energized. Lamp 13 has been connected to the E lead when test key 12 was operated closing contacts 144. This lamp does not light since the circuit is open due to relay 145 being energized. If now test key 11 is operated intermittently, test tone will be sent in pulses around the loop, signal relays will be pulsed at both terminals if the carrier system is in good operating condition in both directions and lamp 13 will be flashed in time with the operation of test key 11.

As indicated heretofore relays 115 and 124 are both locked up in their operated condition in both the near and the distant terminal. In order to release these relays, test key 10 is operated so that at the near terminal relay 115 is deenergized and following it the 124 relay is released. The release of these relays restores the near terminal to service and at the same time removes battery from the M lead of channel 4 permitting 3700 cycle tone to go out in that channel over the system. At the distant terminal the tone causes the operation of the 146 relay at that terminal. By the operation of relay 146, current is allowed to flow through the thermally operated relay 131. After a predetermined period this relay operates providing ground at contact 140, and thereby releasing relays 115 and 124. The release of these relays restores the distant terminal to service. The delay period is introduced to provide that a terminal may be released over the circuit only by a tone interval longer than any likely interfering spurious line noise.

In the absence of the 3700 cycle signal tone, relay 132 releases so that relay 115 is energized through ground at contact 133 which energizes the carrier 3700 alarm through contacts 117'.

What is claimed is:

1. A multi-channel carrier wave signalling system including a transmission line in combination:

a high and low filter means, connected to the transmission line for obtaining a sample portion of the carrier frequency having the highest carrier frequency and from the channel having the lowest carrier frequency, a first and second rectifying means connected to the high and low filter means, respectively, a combining means for obtaining the difference between the rectified voltages, a first amplifying means for amplifying the difference voltage, a variable equalizing network means inserted in the common path of all the carrier channels, connected to the first amplifying means so that the slope component of the frequency characteristic of the transmitted signal is regulated, a vacuum tube means for combining and amplifying another sample portion of the said highest and lowest carrier frequency, a third rectifying means connected to the vacuum tube means so that a direct current voltage proportional to the amplified and combined output of the vacuum tube means is obtained, a reference direct voltage, a means for obtaining the voltage difference between the direct current voltage and the reference direct voltage, a second amplifying means therefor, a variolosser means inserted in the common path for all the carrier channels, a means for connecting the output of the second amplifying means to the variolosser means so that the flat component of the frequency characteristic of the transmitted signal is regulated.

2. A multi-channel carrier signalling system as defined in claim 1, in combination therewith:

a first switching electromagnetic relay having switching contacts, a means for applying the output of said third rectifying means to the switching relay, an alarm means connected to the switching contacts.

3. A multi-channel carrier wave signalling system in accordance with claim 1 and having individual channel regulators to correct for residual deviations in and of the individual channels.

4. A multi-channel carrier wave signalling system as defined in claim 2 in which said alarm means comprises:

a charging means connected to the contacts of said switching relay, a gas filled tube responsive to the charging of said charging means, a relay means responsive to the actuation of the gas filled tube means, an indicating means connected to the relay means.

5. A multi-channel carrier wave signalling system as defined in claim 4 having for each channel a signalling frequency outside the speech band, in combination therewith:

a keyer circuit arranged so as to apply pulses of said signalling frequency to a channel line, a polarized relay for receiving such frequency pulses, a first control relay arranged so as to be energized when said first switching electromagnetic relay is in the released condition, having switching means for locking the control relay in the operated condition, a circuit opening means including switching means, including switching contacts for the first control relay, connected to the keyer circuit and polarized relay so as to disable the application of said frequency pulse responsive to the energizing of said first control relay.

6. A multi-channel carrier wave signalling system as defined in claim 5, in combination therewith:

a vacuum tube carrier oscillator, a first plate voltage source therefor, an additional set of contacts for the first control relay so as to disable or enable the application of said first plate voltage source upon the energizing of the said first control relay.

7. In an office containing telephone supervisory equipment, a multi-carrier wave signalling system in accordance with claim 6, in combination therewith:

an additional set of switching contacts on said first control relay, responsive to the energizing of the said first control relay so as to disable the said telephone system supervisory equipment.

8. A multi-channel carrier signalling system as defined in claim 7, in combination therewith:

a first time delay relay, a second control relay, an additional set of contacts for the first control relay, closed when the first control relay is energized so that the delay relay is energized, a contact means at first delay relay for connecting the delay relay to the second control relay so that, after first control relay is energized, said second control relay is energized in response to the energizing of the first delay relay after a predetermined time, a second plate voltage source, a set of additional switching contacts for the second control relay, so that the said second plate voltage energy source is applied to the carrier oscillator in response to the energization of said second control relay.

9. A multi-channel signalling system as defined in claim 8, in combination therewith:

a manual switching means included in the said circuit opening means, to loop the keyer circuit with the telephone supervisory circuit, an indicating means under the control of said manual switching means.

10. A multi-channel signalling system as defined in claim 9, in combination, means to restore the system to service after a failure, comprising:

a controlling means at the near terminal comprising:

a restoring key having contacts effective when operated to deenergize the locking winding of the first control relay, a set of contacts for the first control relay connected to a set of contacts for the second control relay connected to the keyer circuit so as to restore the terminal to the on-hook and the signalling-tone-on condition, a controlling means at the distant terminal comprising:

a second signal relay responsive to the said signalling frequency transmitted from the near terminal, a second time delay relay, a set of contacts for the second signal relay and the second control relay effective to control the energizing and deenergizing of the second time delay relay, an additional set of contacts controlled by the second control relay, connected to the second time delay relay, a set of contacts controlled by the second time delay relay connected to the first control relay so as to remove the locking winding from the first control relay, thus restoring the terminal to service.

11. A multi-channel signalling system as defined in claim 10, in combination therewith:

a second switching relay connected to the source of the said signalling frequency, a means including a set of switching contacts connected to the said first control relay effective to energize the said first control relay in the absence of signalling tone.

References Cited in the file of this patent

UNITED STATES PATENTS

| | | |
|---|---|---|
| 2,102,138 | Strieby | Dec. 14, 1937 |
| 2,300,415 | Green | Nov. 3, 1942 |
| 2,730,579 | Case et al. | Jan. 10, 1956 |
| 2,876,283 | Lundry | Mar. 3, 1959 |
| 2,878,317 | Evans | Mar. 17, 1959 |
| 2,986,610 | Maurushat | May 30, 1961 |